(12) United States Patent
Park et al.

(10) Patent No.: US 7,746,475 B2
(45) Date of Patent: Jun. 29, 2010

(54) MICROGYROSCOPE

(75) Inventors: Q Han Park, Seoul (KR); Heon Su Jeon, Gunpo-si (KR)

(73) Assignees: Samsung Electronics Co., Ltd. (KR); Seoul National University Industry Foundation (KR)

( * ) Notice: Subject to any disclaimer, the term of this patent is extended or adjusted under 35 U.S.C. 154(b) by 0 days.

(21) Appl. No.: 12/245,970

(22) Filed: Oct. 6, 2008

(65) Prior Publication Data

US 2009/0091763 A1 Apr. 9, 2009

(30) Foreign Application Priority Data

Oct. 9, 2007 (KR) ............... 10-2007-0101266
Sep. 16, 2008 (KR) ............... 10-2008-0090705

(51) Int. Cl.
*G01C 19/72* (2006.01)
(52) U.S. Cl. ..................................... 356/460
(58) Field of Classification Search .......... 356/460
See application file for complete search history.

(56) References Cited

U.S. PATENT DOCUMENTS

2007/0153289 A1* 7/2007 Yilmaz et al. ............... 356/464

OTHER PUBLICATIONS

"Highly efficient hybrid fiber taper coupled microsphere laser"; Authors: Ming Cai, et al.; Optics Letters, vol. 26, No. 12, Jun. 15, 2001 (pp. 884-886).

"Modeling and Design of a Novel Miniaturized Integrated Optical Sensor for Gyroscope Systems"; Authors: Mario N. Armenise, et al.; Journal of Lightwave Technology, vol. 19, No. 10, Oct. 2001 (pp. 1476-1494).

* cited by examiner

*Primary Examiner*—Tarifur Chowdhury
*Assistant Examiner*—Jonathon D Cook
(74) *Attorney, Agent, or Firm*—Cantor Colburn LLP

(57) ABSTRACT

A new high-performance, compact microgyroscope is implemented using a microlaser such as a microsphere laser or a microdisc laser that can be easily reduced in size. The microgyroscope includes a pumping unit for inputting pumping light for optical pumping, at least one microsphere or microdisc for oscillating a laser beam by performing optical pumping using light received from the pumping unit, an output coupler for receiving the oscillated laser beam from the microsphere or microdisc, and a photodetector for calculating a beat frequency due to interference between beams output from the output coupler to measure rotation. The pumping unit and the output coupler are constructed using a tapered optical fiber.

6 Claims, 3 Drawing Sheets

MICROGYROSCOPE

This application claims priority to Korean Patent Application No. 2007-101266, filed on Oct. 9, 2007, and Korean Patent Application No. 2008-0090705, filed on Sep. 16, 2008, and all the benefits accruing therefrom under U.S.C. §119, the contents of which are incorporated herein by reference in their entireties.

BACKGROUND OF THE INVENTION

1. Field of the Invention

The present invention relates to a microgyroscope, and more particularly to a new high-performance, compact microgyroscope that can be easily reduced in size.

2. Description of the Related Art

Gyroscopes are inertial sensors that are widely used in airplanes, spacecrafts, and satellites and applications have spread to most industrial fields such as robots, automatic safeguarding equipment, remote controllers, and navigation assistants. Thus, there has been a demand for a lightweight, low power consumption, compact, and highly integrated gyroscope.

Gyroscopes that measure rotational movement of an object are divided into a mechanical type that uses an oscillator or the like and an optical type that uses laser or the like. Many studies have been made into optical gyroscopes since they can immediately start operation and exhibit a wide operating range. Optical gyroscopes mostly employ a ring interferometer scheme and a ring laser scheme. In the ring interferometer scheme, an optical fiber is wound into a ring and laser beams traveling in opposite directions in the optical fiber interfere with each other. Then, based on changes in the interference between the laser beams traveling in the opposite directions, a difference between lengths of paths through which the two laser beams travel as rotation occurs is measured to read the amount of the rotation.

FIG. 1 schematically illustrates a ring laser gyroscope. As shown in FIG. 1, in the ring laser scheme, a laser cavity is formed of a closed circuit and the interference between laser beams oscillated in both directions along the closed circuit is then measured. The laser beams are oscillated in opposite directions at different frequencies when rotation occurs and the difference between the frequencies is proportional to the amount of the rotation. Accordingly, the ring laser scheme exhibits high performance since the amount of rotation is measured by measuring the difference between the frequencies of laser beams based on interference between the laser beams.

However, application of optical gyroscopes is restricted since they are generally large in volume and also expensive.

BRIEF SUMMARY OF THE INVENTION

The present invention thus provides a microgyroscope that is implemented using a microlaser such as a microsphere laser or a microdisc laser that can be reduced in size.

Disclosed herein is, in exemplary embodiments, a gyroscope that can be easily reduced in size. An exemplary embodiment provides a gyroscope wherein a pumping unit for inputting pumping light for optical pumping and a portion for oscillating a laser beam through optical pumping or a portion for outputting a laser beam can be integrated into a single unit so that the gyroscope can be easily reduced in size and provides a gyroscope that achieves high performance using the same interference measurement method as the ring laser scheme that exhibits relatively high performance since it performs measurement based on the difference between frequencies of laser beams (i.e., based on the interference between the laser beams) even though the gyroscope is reduced in size.

Also disclosed herein is, in exemplary embodiments, a gyroscope that can measure complicated rotational movements.

In accordance with an exemplary embodiment, there is provided a microgyroscope including a pumping unit for inputting pumping light for optical pumping, at least one microsphere or microdisc for oscillating a laser beam by performing optical pumping using light received from the pumping unit, an output coupler for receiving the oscillated laser beam from the microsphere or microdisc, and a photodetector for calculating a beat frequency due to interference between beams output from the output coupler to measure rotation, wherein the pumping unit and the output coupler are constructed using a tapered optical fiber.

The at least one microsphere or microdisc may include a pair of microspheres or microdiscs, a combination of the pumping unit and the output coupler may be a single tapered optical fiber and the pair of microspheres or microdiscs may be connected to both sides of the tapered optical fiber. The tapered optical fiber may have a hybrid fiber taper coupling structure with different Single Mode Fiber ("SMF") modes in which an input optical fiber and an output optical fiber for the microsphere or microdisc are joined to create a taper structure.

In accordance with another exemplary embodiment, the at least one microsphere or microdisc may include a single microsphere or microdisc, the output coupler may include two tapered optical fibers connected to sides of the microsphere or microdisc, and the tapered optical fibers may be joined at a Y juncture to combine beams received from the microsphere or microdisc. The pumping unit and the microsphere or microdisc may be constructed using a single optical fiber (for example, an erbium doped fiber ("EDF")) and the microsphere or microdisc may be formed by fusing an end of the optical fiber using a laser beam.

In accordance with another exemplary embodiment, the at least one microsphere or microdisc may include an array of microspheres or microdiscs.

BRIEF DESCRIPTION OF THE DRAWINGS

The exemplary embodiments will be more clearly understood from the following detailed description taken in conjunction with the accompanying drawings, in which.

DETAILED DESCRIPTION OF THE INVENTION

Figure 1:
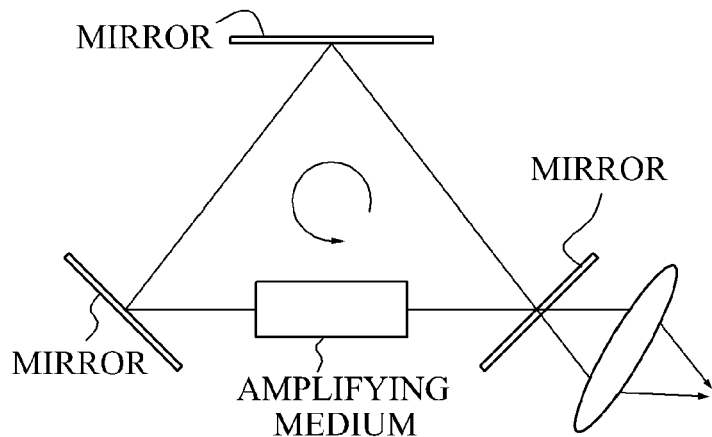
FIG. 1 schematically illustrates a ring laser gyroscope of the prior art.

Exemplary embodiments will now be described in detail with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

An embodiment provides a microgyroscope including a pumping unit for inputting pumping light for optical pumping, at least one microsphere or microdisc for oscillating a laser beam by performing optical pumping using light received from the pumping unit, an output coupler for receiving the oscillated laser beam from the microsphere or microdisc, and a photodetector for calculating a beat frequency due to interference between beams output from the output coupler to measure rotation, wherein the pumping unit and the output coupler are constructed using a tapered optical fiber.

The gyroscope according to an embodiment can be reduced in size using a microsphere or microdisc (laser).

The tapered optical fiber may be formed by stretching a part of a single mode optical fiber to reduce a thickness thereof. The tapered optical fiber can be manufactured by heating a part of the optical fiber.

The microsphere is formed so as to have a micron size by fusing a part of an erbium-doped fiber ("EDF") using a $CO_2$ laser beam. The microdisc is a type of semiconductor laser. Specifically, the microdisc is a laser of a wide disk type that is micrometers in thickness and is tens to hundreds of micrometers in horizontal or vertical lengths in plane and oscillates planar laser beams of one or two wavelengths.

An evanescent wave is an electromagnetic field that exponentially decreases in intensity in proportion to distance from an interface between a medium with a high refractive index and a medium with a low refractive index when light is incident on the medium with the low refractive index from the medium with the high refractive index at an angle greater than a critical angle for total internal reflection. Evanescent waves are found at an interface of a planar waveguide with different refractive indices, a core-clad interface of an optical fiber, and a minute circular resonator. The presence of evanescent waves can be confirmed by measuring combined signals output from a microsphere when a sharp optical fiber tip is placed near an external surface of the microsphere. A resonance mode of a sphere or the like is referred to as a "Whispering Gallery Mode ("WGM")". As mode number "n" increases and as mode order "1" decreases, the "Q" value of the resonance mode increases. The Q value of a micro-resonator that is sensitive to thermal perturbations similar to a liquid jet or liquid drop is only about $10^7$. However, the Q value measured at a solid sphere like a silica microsphere is about $10^{19}$ so that it may be implemented as a resonator with a very low loss.

In accordance with exemplary embodiments, the at least one microsphere or microdisc may include a pair of microspheres or microdiscs, a combination of the pumping unit and the output coupler may be a single tapered optical fiber and the pair of microspheres or microdiscs may be connected to both sides of the tapered optical fiber. The tapered optical fiber may have a hybrid fiber taper coupling structure with different Single Mode Fiber ("SMF") modes in which an input optical fiber and an output optical fiber for the microsphere or microdisc are joined to create a taper structure.

Figure 2:
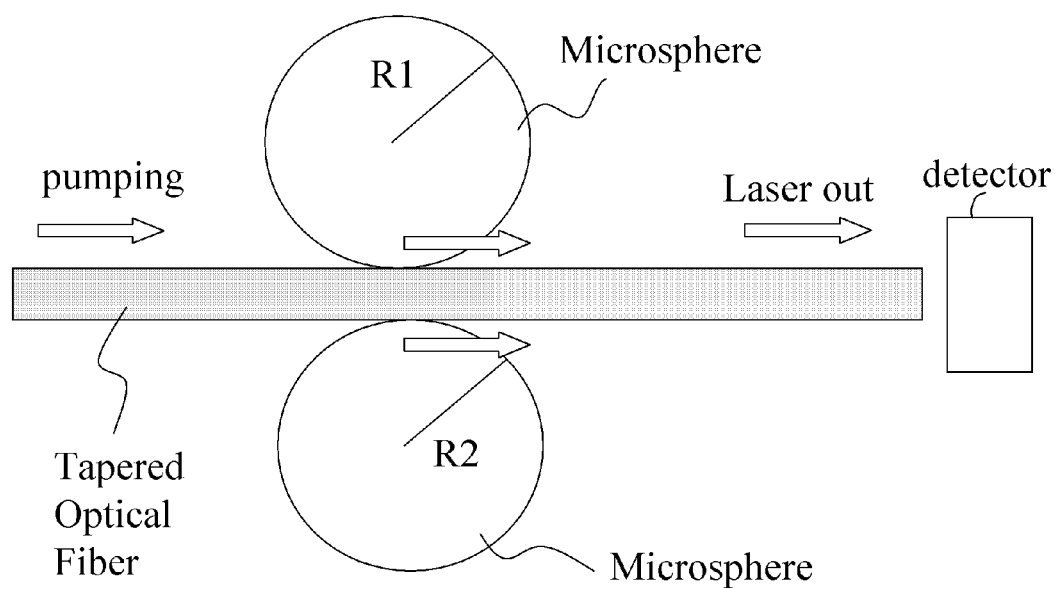
FIG. 2 schematically illustrates an exemplary microgyroscope including a tapered optical fiber and two microspheres attached to both sides of the tapered optical fiber according to an exemplary embodiment.

FIG. 2 schematically illustrates an exemplary microgyroscope including a tapered optical fiber and two microspheres attached to both sides of the tapered optical fiber according to an exemplary embodiment. A tapered optical fiber formed by stretching an optical fiber is placed on a side of each microsphere and erbium (Er) in the microsphere oscillates a laser beam in a Whispering Gallery Mode ("WGM"). The oscillated beam exits the micro sphere and reenters the tapered optical fiber, thereby obtaining a microsphere laser beam oscillated, for example near 1550 nm. The standard of the optical fiber is not limited to a specific standard since the standard of the optical fiber can be changed. Such a microsphere laser is used to construct a gyroscope. In an exemplary embodiment, the same mode of optical fibers may be used as the tapered optical fibers at both sides of the spheres (at the left and right sides thereof in FIG. 2). However, in alternative exemplary embodiments, a hybrid tapered optical fiber mode, in which optical fibers of different modes are used for both the pumping and output portions for the microsphere, can be used since the use of optical fibers of the same mode may cause substantial loss.

Since the microsphere laser using these micro-resonator laser characteristics is simple in structure and can be reduced in size, the microsphere laser can be used as a high-quality resonator with significantly low loss. Therefore, the microsphere laser can compensate for the problems of conventional ring laser gyroscopes, in that the applications of conventional ring laser gyroscopes are limited since they are high in price and large in size.

Figure 3:
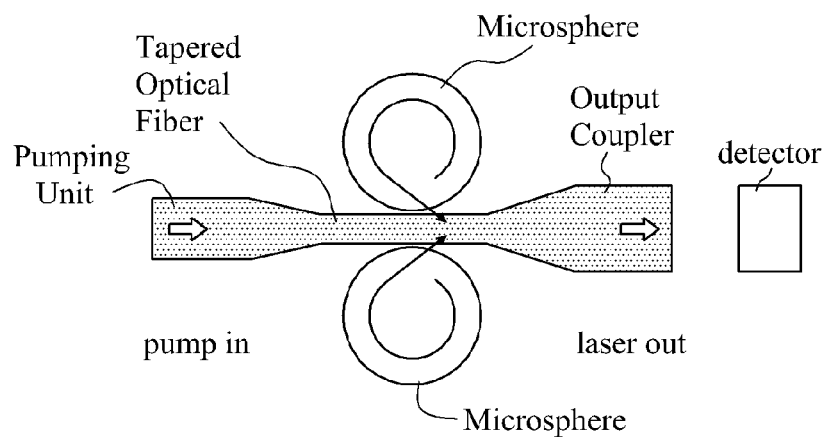
FIG. 3 illustrates an exemplary microgyroscope including a hybrid tapered optical fiber according to an exemplary embodiment.

A coupler including a tapered optical fiber or the like provides efficient coupling to WGMs without reducing the qualities of the microspheres. FIG. 3 illustrates an exemplary microgyroscope including a hybrid tapered optical fiber according to an exemplary embodiment. In one exemplary embodiment, let us consider a new laser based on a hybrid fiber taper wherein a microsphere is coupled to a continuous tapered fiber, which is a combination of a 980 nm single mode fiber ("SMF") and a 1550 nm SMF. A pumping beam and a laser emission are both guided in an SMF to or from the taper region. This structure achieves highly efficient power transfer between the microresonator and the respective pump-input and emission-output non-tapered fiber regions. A 1550 nm-band microsphere laser is formed by bringing an erbium-doped microsphere into contact with a tapered fiber. The 980 nm pump source is guided from one end of the fiber to the taper-microsphere coupling region. In the taper region, the SMF mode is converted into air-cladding taper modes that extend into the air surrounding the taper. Power transfer to the microsphere occurs over the region in which the taper is in proximity to the sphere WGMs. Similarly, the 1550 nm-band laser emission is coupled back into the taper and is finally converted into an SMF mode.

To efficiently pump the microsphere, it is necessary to achieve good phase matching between the fundamental taper mode and a WGM of the sphere. Previously, the fiber taper was formed with a single standard 1550 nm SMF. The pump source and the laser emission were both guided in the single tapered fiber. The 1550 nm SMF generally has a cutoff wavelength at 1250 nm. As a result, for the 980 nm pump source, it is necessary to satisfy some conditions to reduce loss and it is not easy to achieve matching. Accordingly, it is possible to employ a hybrid fiber taper coupling structure including both the 980 nm and 1550 nm SMFs. This structure may be constructed in the following manner. First, a part of the 1550 nm SMF and a part of the 980 nm SMF part are joined together by putting the SMF parts on each other. The fiber combined in this manner is then tapered by stretching it slowly apart to some extent. Inasmuch as the taper modes are defined by the taper size and the material's refractive index, the splice in the center region is less disadvantageous to those of other types of tapers. The hybrid taper is provided below the sphere with the 980 nm SMF located at the left side and the 1550 nm SMF located at the right side. A pumping wave is oscillated by a 980 nm single-mode tunable external-cavity laser. The pumping wave is resonantly coupled into a fundamental WGM, producing a narrow equatorial-ring gain region. The taper-sphere contact position is adjusted appropriately to achieve best results. The hybrid fiber taper was suggested as a coupler, which is very efficient in this system.

In the microgyroscope according to the exemplary embodiments, components such as the microsphere or microdisc and the optical output unit or components such as the optical output unit and the pumping unit are constructed as a single unit such that they simultaneously rotate, unlike the mechanical gyroscope in which only a specific portion rotates. As shown in FIG. 2, the pumping light is simultaneously pumped into the two spheres and the laser beams oscillated in the spheres rotate differently and are then collected at the single fiber through the output coupler and are then detected by the detector. In this case, since the frequencies of the laser beams oscillated in the two spheres change according to the amount of rotation, the detector measures the difference between the frequencies of the laser beams to measure the amount of rotation. That is, when rotation occurs, the frequencies of the oscillated laser beams are changed to cause changes in the output laser beam, and therefore the rotation can be measured by measuring changes in the frequencies.

Microspheres and microdiscs are not substantially different in terms of operation and mechanism and are only slightly different in manufactured shape. In the case of the microdiscs, laser beams oscillated in the microdiscs rotate differently and are then collected at an etched waveguide via the output coupler. Thus, it will be understood by those skilled in the art that the mechanism of the microdisc is similar to that of the microsphere. With the microdisc, it will be easier to integrate the components of the microgyroscope into a single unit since the microdisc and an input/output coupler waveguide can be manufactured on a single substrate, unlike the microsphere.

Reference will now be made to an algorithm used for separately measuring clockwise and counterclockwise signals at the output end of the microgyroscope. Let us consider that laser beams oscillated in m1 and m2 modes exit two microspheres having radiuses R1 and R2 that are attached to a tapered optical fiber. In this case, the frequencies of the laser beams may be represented as follows.

$$f_1 = \frac{m_1 \pi c}{2\pi R_1}$$

$$f_2 = \frac{m_2 \pi c}{2\pi R_2}$$

When the microgyroscope rotates at an angular speed of $\Omega$, changes in the frequencies of the laser beams are represented as follows, where c is a speed of light.

$$\Delta f_1 = \frac{2 f_1 R_1 \Omega}{c} = m_1 \Omega$$

$$\Delta f_2 = \frac{2 f_2 R_2 \Omega}{c} = m_2 \Omega$$

When the microgyroscope does not rotate, the laser beams with frequencies f1 and f2 interfere with each other so that a beat frequency of $f_{beat}$ (=f1−f2) is measured. When the microgyroscope rotates, a change is made in the beat frequency as follows.

$$\Delta f_{beat} = \Delta f_1 - \Delta f_2 = (m_1 + m_2)\Omega$$

Accordingly, rotation can be easily measured by measuring the beat frequency. Here, the proportional factor "m1+ m2" can be easily determined through calibration at an initial stage since the proportional factor "m1+m2" is a fixed constant.

Using two microspheres as described above provides a variety of advantages including no complexity of having to separate clockwise and counterclockwise laser beams and then to combine the laser beams as when a single microsphere is used, no measurement problem even when the microspheres have different sizes, ease of manufacturing the microspheres, and measurement is simple.

A microgyroscope according to an exemplary embodiment may include microspheres having different sizes placed at both sides of an optical fiber. When two microspheres are used, it is not easy to manufacture them with the same size. It is much easier to manufacture a microgyroscope with two microspheres with different sizes since the microgyroscope can operate even if the sizes of the microspheres are not exactly equal.

Figure 4:
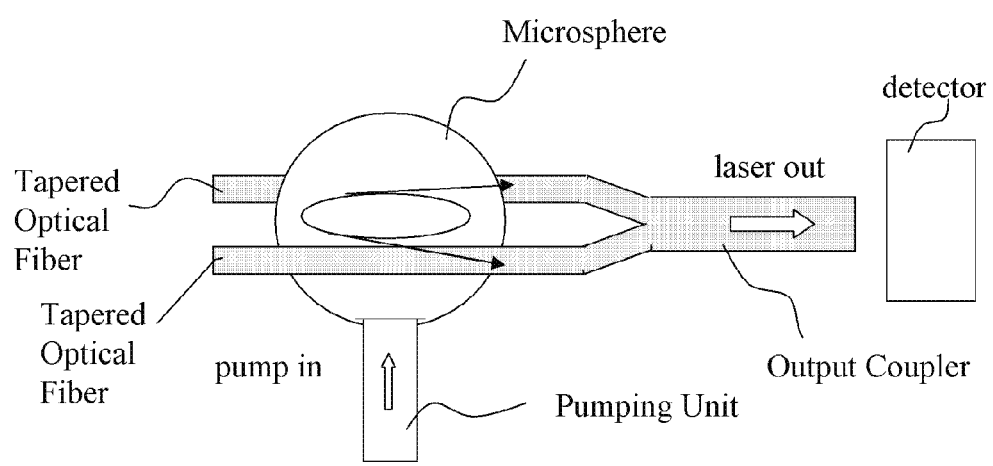
FIG. 4 schematically illustrates an exemplary microgyroscope including a single microsphere according to an exemplary embodiment.

In the exemplary embodiments, when the microgyroscope includes a single microsphere or microdisc, a Y junction at which two optical fibers are joined as an output coupler is needed to measure rotations using interference between beams oscillated in the microsphere or microdisc. FIG. 4 schematically illustrates an exemplary microgyroscope including a single microsphere according to an exemplary embodiment. As shown in FIG. 4, the output coupler is a combination of two tapered optical fibers connected to both sides of the microsphere. The tapered optical fibers are jointed at the Y junction to combine beams received from the microsphere or microdisc. Accordingly, pumped beams are oscillated in the microsphere and the oscillated beams then exit the microsphere and enter the two optical fibers and are then collected at the Y junction. Here, the pumping unit and the microsphere are made of a single optical fiber. The pumping unit and the microsphere can be integrated into a single unit since the microsphere can be formed by fusing an end of the optical fiber using a laser beam.

In the exemplary embodiments, two polarized beams propagating in opposite directions are generated in the microsphere and are then combined at the output coupler. The beams propagate in the separate branches of the coupler and are then combined at the Y junction and the combined beam is detected by a photodetector. When the external rotation speed is zero, the output of the photodetector is constant and the constant level can be set through appropriate calibration of a modulator. When rotation occurs, a phase shift with a frequency difference between the two waves can be obtained. The size of the coupling gap depends on the coupling coefficient, the coupling length, and the like and the optimal position thereof is selected.

A description will now be given of an example wherein the clockwise and counterclockwise resonators of the microspheres in the gyroscope according to the exemplary embodiments move. No difference occurs between the clockwise and counterclockwise resonators when the resonators move linearly. When a resonator rotates about a line not coincident with the center of the resonator, the measurement of the rotational movement of the resonator is not associated with the position of a rotational axis of the resonator passing through the center of the resonator since the entire movement of the resonator is the sum of the same amount of rotational movement as the rotational movement of the resonator and a transitional movement of the rotational axis. Accordingly, even when the center of rotation of the clockwise resonator is different from that of the counterclockwise resonator, the rotational movement can be measured using the simple-structured gyroscope according to the exemplary embodiments.

The photodetector measures rotation by calculating the beat frequency due to interference between beams output from the output coupler. The photodetector can be constructed using any photoelectrical element such as a photodiode that converts light into an electrical signal.

Figure 5:
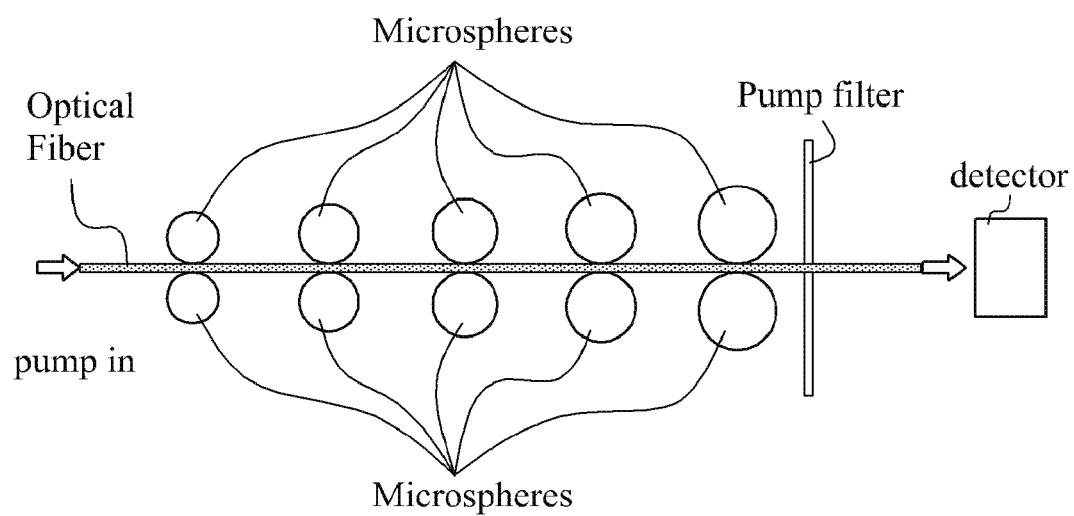
FIG. 5 illustrates an exemplary microgyroscope that includes an array of spheres to enable measurement of a complicated rotational movement according to another exemplary embodiment.

According to another exemplary embodiment, there is provided an array-type microgyroscope including multiple microspheres or microdiscs. FIG. 5 illustrates an exemplary microgyroscope that includes an array of spheres to enable measurement of a complicated rotational movement according to this exemplary embodiment. As shown in FIG. 5, spheres (disks) are attached to a single fiber (or waveguide) in an array form at both sides of the single fiber. In this case, if an array of spheres having different sizes is attached to the fiber, laser beams can be oscillated at different frequencies in the spheres and a detector can classify and analyze a spectrum of the frequencies of the oscillated laser beams to enable measurement of a different amount of rotation at the position of each sphere. In this case, through calculation, it is possible to determine the center of the rotation to enable measurement and analysis of a complicated rotational movement. In addition, a motion sensor that can measure complex movement of a surface can be implemented using a mesh-type tapered optical fiber. The array-type microgyroscope may further include a pump filter that is constructed using a single-mode hybrid optical fiber and filters out pumping light in order to prevent the pumping light from being output together with the oscillated laser beams from the optical fiber.

The gyroscope according to the exemplary embodiments can be significantly reduced in size since the pumping unit for inputting pumping light for optical pumping and the portion of outputting oscillated laser beams can be very easily integrated into a single unit or the pumping unit and the laser beam oscillating unit can be very easily integrated into a single unit. The gyroscope can be reduced to a micron size using microspheres or the like. The gyroscope according to the exemplary embodiments can exhibit high sensitivity using a measurement method similar to that of the ring laser gyroscope. It is also possible to very easily measure complicated rotational movements using an array of microspheres. The spirit or principle of the exemplary embodiments can be easily applied to various other types of configurations.

Those skilled in the art will appreciate that the exemplary embodiments may be carried out in other ways than those set forth herein without departing from the spirit and essential characteristics of the exemplary embodiments. The above embodiments are therefore to be construed in all aspects as illustrative and not restrictive. The scope of the exemplary embodiments should be determined by the appended claims and their legal equivalents, not by the above description, and all changes coming within the meaning and equivalency range of the appended claims are intended to be embraced therein. For example, any modifications of the microsphere or microdisc which can be embodied as a micro-laser and any other type which can be embodied as a micro-laser (for example, a WGM laser) are included in the exemplary embodiments provided that they use the spirit of the exemplary embodiments.

What is claimed is:

1. A microgyroscope, comprising:
   a tapered optical fiber defining a pumping unit and an output coupler, the pumping unit inputting pumping light for optical pumping;
   first and second microspheres or microdiscs disposed on first and second sides, respectively, of the tapered optical fiber, the first and second microspheres or microdiscs oscillating first and second laser beams, respectively, therein by performing optical pumping using the pumping light received from the pumping unit;

the output coupler receiving the oscillated laser beam from the first and second microspheres or microdiscs; and a photodetector receiving the first and second laser beams and a processor that receives an output from the photodetector and calculates a beat frequency due to interference between the first and second laser beams output from the output coupler to measure rotation.

2. The microgyroscope according to claim 1, wherein the tapered optical fiber has a hybrid fiber taper coupling structure with different Single Mode Fiber modes in which an input optical fiber and an output optical fiber for the microsphere or microdisc are joined to create a taper structure.

3. The microgyroscope according to claim 1, further comprising multiple pairs of microspheres or microdiscs, and the multiple pairs of microspheres or microdiscs are connected in an array form to both sides of the tapered optical fiber.

4. The microgyroscope according to claim 3, further comprising a pump filter for filtering out the pumping light located near an end of the output coupler.

5. A microgyroscope, comprising:

a pumping unit inputting pumping light;

a single microsphere or microdisc oscillating first and second laser beams therein by performing optical pumping using the pumping light received from the pumping unit;

an output coupler having first and second tapered optical fibers connected to first and second sides, respectively, of the single microsphere or microdisc, and a Y juncture coupled to the first and second tapered optical fibers to combine the first and second laser beams therein; and a photodetector receiving the first and second laser beams from the Y juncture and a processor that receives a beat frequency due to interference between the first and second laser beams to measure rotation.

6. The microgyroscope according to claim 5, wherein the pumping unit and the single microsphere or microdisc are constructed using a single optical fiber, and the single microsphere or microdisc is formed by fusing an end of another optical fiber using another laser beam.

* * * * *